Aug. 14, 1934.  F. A. BYLES  1,970,415
ELECTRICAL REGULATING SYSTEM
Filed Sept. 23, 1932
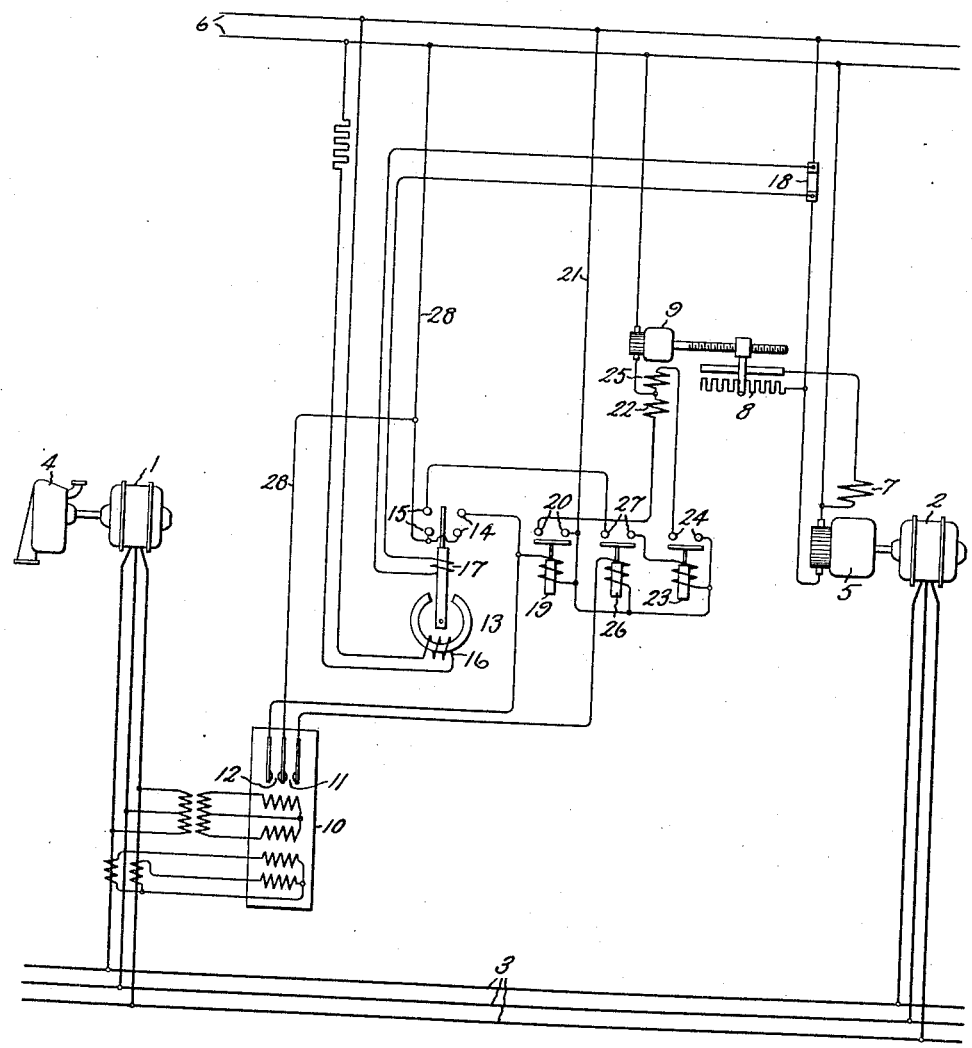
Inventor:
Frank A. Byles,
by Charles E. Mueller
His Attorney.

Patented Aug. 14, 1934

1,970,415

UNITED STATES PATENT OFFICE 1,970,415

ELECTRICAL REGULATING SYSTEM

Frank A. Byles, Scotia, N. Y., assignor to General Electric Company, a corporation of New York Application September 23, 1932, Serial No. 634,556

5 Claims. (Cl. 171—312)

My invention relates to electrical regulating systems and more particularly to an automatic regulating system for controlling the load relation between a plurality of power translating devices.

It is often desirable to control the load division between a plurality of power translating devices, such as parallel connected generators. For example, it may be desirable for one generator to carry substantially all of the load, up to its full load rating whereupon the other generator or generators, will assume any marginal increases in load. Automatic systems for accomplishing this result are known in the art. In accordance with my invention, I provide a novel and improved system for accomplishing this result.

An object of my invention is to provide a new and improved electrical regulating system.

A further object of my invention is to provide a novel, simple and reliable system for securing a desired load distribution among a plurality of power translating units.

My invention will be better understood from the following description taken in connection with the accompanying drawing, and its scope will be pointed out in the appended claims.

Referring now to the single figure of the accompanying drawing, I have shown diagrammatically therein a preferred embodiment of my invention as applied to a pair of parallel connected alternating current generators 1 and 2 which are connected to supply power to a load circuit 3. Generator 1 may be driven by any suitable prime mover and as shown it forms part of a prime-mover-generator set, of which the other part is a turbine 4. Similarly, generator 2 may be driven by any suitable source of power and as shown it forms part of a motor-generator set of which the other part is a direct current motor 5. Motor 5 is connected to be energized from a suitable direct current supply circuit 6. Motor 5 is provided with a shunt field winding 7 having in series therewith a field resistance 8. A convenient way of varying, or controlling, the power transferred through the motor-generator set is to vary the value of resistance 8. Thus if the value of resistance 8 is increased the power transferred by the motor-generator set is increased, while if the resistance 8 is decreased the power transferred is decreased, as will be well understood by those skilled in the art. A suitable reversible pilot motor 9 is provided for varying the value of resistance 8.

Associated with generator 1 is a power responsive circuit controller, or relay, 10 in the form of a contact making wattmeter having a set of underpower closing contacts 11, which close when the power output of generator 1 is below a predetermined value, such for example as the full load rating of generator 1, and a set of over-power closing contacts 12 which close when the power output of generator 1 is above a predetermined value, such for example as the full load rating of generator 1. Similarly, the motor-generator set 2—5 has associated therewith a power, or current, directional, responsive circuit controller, or relay, 13 having a set of underpower, or reverse current, closing contacts 14 which close when the power transferred through the motor-generator set is below a predetermined value, such for example as zero power transfer, and a set of over-power, or over current, contacts 15 which close when the power transfer through the motor-generator set is above a predetermined value, such for example as zero power transfer. Any value of power transfer less than zero power transfer is considered a power flow in the reverse direction through the motor-generator set in which case the generator 2 will be acting as a motor to drive the motor 5 as a generator. Relay 13 may be any conventional reverse current relay and it is provided with a potential winding 16, connected across circuit 6, and a current winding 17, connected to respond to the current flow in the motor 5 of the motor-generator set by means of a suitable current reducing shunt 18. Relay 10 may be a conventional three phase contact making wattmeter.

For controlling the energization of motor 9, I provide a relay 19 having a set of contacts 20. These contacts, when closed, complete a circuit from supply circuit 6 through a conductor 21, contacts 20, a field winding 22 for motor 9 and back to the other side of the supply circuit 6. This circuit causes motor 9 to operate in such a direction as to increase the resistance of resistance 8 and thereby increase the value of power transferred through the motor-generator set. For controlling the operation of motor 9 in the opposite direction, I provide a relay 23 having a set of contacts 24. When relay 23 closes contacts 24, an operating circuit for motor 9 is completed through conductor 21, contacts 24, a field winding 25 on motor 9, and the armature winding of motor 9, and back to the other side of the supply 6. This circuit causes a reverse operation of motor 9 and causes the resistance 8 to be decreased, thereby decreasing the power transfer through the motor-generator set. An auxiliary relay 26, having a set of contacts 27, is provided for the purpose of insuring that the relay 23 can only be energized upon the concurrent closure of under-power contacts 11 of relay 10 and over-power contacts 15 of relay 13. The reason for this will be explained later.

The energization of relay 19 is controlled by the over-power closing contacts 12 of relay 10 and also by the under-power closing contacts 14 of relay 13. Thus, relay 19 is energized from circuit 6 through a conductor 28, either the contacts 12 or the contacts 14, and back to the other side of the supply circuit through conductor 21. Auxiliary relay 26 is energized upon the closure of under-power closing contacts 11 of relay 10 through a circuit consisting of conductor 28, contacts 11, relay 26 and conductor 21 back to the other side of supply 6. Relay 23 is energized by a circuit including the series connected contacts 15, of relay 13, and 27 of relay 26.

The operation of the illustrated embodiment of my invention is as follows: Assume that turbine 4 is operating generator 1 and that the total load on circuit 3 is less than the full load rating of generator 1. Under these circumstances, under-power closing contacts 11 will be closed and relay 26 will consequently be energized thereby to maintain its contacts 27 closed. If now the motor-generator set tends to send power in a positive direction from the supply circuit 6 to the load circuit 3, the relay 13 will respond thereby to close its over-power closing contacts 15. A circuit will then be completed through conductor 28, contacts 15 and 27, the relay 23 and return conductor 21. Operation of the relay 23 causes motor 9 to decrease the resistance 8, thereby tending to make motor 5 run at a slower speed and reduce the power flow through the motor-generator set. If, on the other hand, the power flow through the motor-generator set tends to be in a negative direction, that is, from the load circuit 3 to the supply circuit 6, the relay 13 will respond and its under-power closing contacts 14 will close, thereby completing an energizing circuit for relay 19. This will cause closure of contacts 20 and cause motor 9 to operate in a reverse direction to increase the resistance 8, and thereby increase the power flow through the motor-generator set. Thus under the above assumed conditions generator 1 carries all the load and generator 2 operates at substantially no load.

If now the load on circuit 3 increases until it is substantially equal to the full load rating of generator 1, under-power closing contacts 11 will open thereby deenergizing auxiliary relay 26. This prevents the possibility of contacts 15 of relay 13 controlling motor 9 in such a manner as to decrease the power flow through the motor-generator set. Therefore, when generator 1 is fully loaded generator 2 cannot unload. This is desirable as unloading generator 2 would then overload generator 1.

If now the load on circuit 3 exceeds the full load rating of generator 1, the over-power contacts 12 of relay 10 will close, thereby causing the energization of relay 19 which in turn will operate motor 9 in a direction to increase the resistance 8, thereby increasing the power flow through the motor-generator set. This action will continue until such time as sufficient resistance has been inserted in the shunt field winding circuit of motor 5 to cause the motor-generator set to carry all the marginal load above the full load rating of generator 1. As soon as this takes place, the over-power contacts 12 will open and motor 9 will come to rest.

It will thus be seen that for any load less than the full load rating of machine 1 the power transfer through the motor-generator set is maintained substantially zero, while machine 1 carries substantially all of the load. For any load above the full load rating of generator 1, the motor-generator set carries all the marginal load and the load on generator 1 does not exceed its full load rating.

It will be obvious to those skilled in the art that none of the relays 19, 23 or 26 are essential to my invention and that the operating circuit of motor 9 through field winding 22 could be controlled directly by contacts 12 and 14 connected in parallel, while the operating circuit of motor 9 through field winding 25 could be controlled directly by contacts 11 and 15 in series, if desired, without departing from my invention in its broader aspects. It will also be clear to those skilled in the art, that if it is desirable to minimize any tendency of the regulating system to hunt or over regulate, this may be effectively minimized in a well known manner by connecting a suitable intermittent switch, or notching device, or other anti-hunting mechanism in the circuit conductor 28. Such arrangements are well known for preventing hunting action in regulating systems.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a pair of power translating devices, a pair of power responsive elements connected respectively to respond to the power translated by said devices, one of said elements having an over-power closed circuit controller, the other of said elements having an under-power closed circuit controller, and means responsive to the closure of either one of said circuit controllers for increasing the power translated by the device whose corresponding element has said under-power closed circuit controller.

2. In combination, a pair of power translating devices, a pair of power responsive elements connected respectively to respond to the power translated by said devices, each of said elements having an over-power actuated circuit controller and an under-power actuated circuit controller, means responsive to the concurrent actuation of an over-power actuated controller of one element and an under-power actuated controller of the other element for reducing the power translated by the device whose power responsive element has said last mentioned over-power actuated circuit controller, and means responsive to the actuation of either of the remaining two circuit controllers for increasing the power translated by said last mentioned device.

3. In combination, a pair of parallel connected generators a pair of power responsive relays connected respectively to respond to the power output of said generators, one of said relays having a set of contacts which are closed when the power output of its associated generator exceeds a predetermined value, the other of said relays having a set of contacts which are closed when the power output of its associated generator is below a predetermined value, and means responsive to the closure of either of said sets of contacts for increasing the power output of the generator whose associated relay has the set of contacts which are closed when the power output is below a predetermined value.

4. In combination, a load circuit, a pair of generators connected in parallel to said circuit, a pair of power responsive relays connected respectively to respond to the power output of said generators, each of said relays having overpower and under-power actuated contacts, means responsive to the concurrent actuation of the under-power actuated contacts of one relay and the over-power actuated contacts of the other relay for reducing the power output of the generator whose relay has said last mentioned overpower actuated contacts, and means responsive to the actuation of either of the remaining two sets of contacts for increasing the power output of said last mentioned generator.

5. In combination, a variable load circuit, a pair of generators connected in parallel thereto, a relay connected to be responsive to the power output of one of said generators and having a set of contacts which close when the power output of said generator is above zero and having another set of contacts which close when the power output of said generator is less than zero, another relay connected to be responsive to the power output of the other generator and having a set of contacts which close when the power output of said other generator is above full load and having another set of contacts which close when the power output of said other generator is below full load, means responsive to the concurrent closing of the first mentioned set of contacts of the first mentioned relay and the last mentioned set of contacts of the last mentioned relay for reducing the power output of the generator associated with said first mentioned relay, and means responsive to the closing of either of the other two sets of contacts for increasing the power output of the generator associated with said first mentioned relay.

FRANK A. BYLES.